United States Patent [19]

Muraoka et al.

[11] Patent Number: 5,859,142
[45] Date of Patent: Jan. 12, 1999

[54] RUBBER COMPOSITION FOR REINFORCING BEAD OF TIRES WHICH CONTAINS BUTADIENE RUBBER WITH SYNDIOTACTIC CRYSTALS, CARBON BLACK, SULFUR AND SULFENAMIDE ACCELERATOR

[75] Inventors: Kiyoshige Muraoka; Yoko Nakada; Takahiro Fukumoto, all of Kobe; Toru Iizuka, Akashi; Kaoru Koyama, Shirakawa, all of Japan

[73] Assignee: Sumitomo Rubber Industries, Ltd., Hyogo, Japan

[21] Appl. No.: 313,590

[22] Filed: Sep. 29, 1994

[30] Foreign Application Priority Data

Sep. 29, 1993 [JP] Japan .................................. 5-243280

[51] Int. Cl.⁶ ................................................... C08C 19/20
[52] U.S. Cl. ............................................ 525/236; 525/349
[58] Field of Search ...................... 525/236, 237

[56] References Cited

U.S. PATENT DOCUMENTS

| | | | |
|---|---|---|---|
| 5,023,301 | 6/1991 | Burlett | 525/236 |
| 5,026,762 | 6/1991 | Kida | 524/495 |
| 5,104,941 | 4/1992 | Wolpers | 525/237 |
| 5,341,863 | 8/1994 | Sandstrom | 525/232 |

*Primary Examiner*—Christopher Henderson
*Attorney, Agent, or Firm*—Birch, Stewart, Kolasch & Birch, LLP

[57] ABSTRACT

A rubber composition suitable for reinforcing beads of tires, having high hardness, high durability and high aging resistance, which comprises a rubber component containing 30 to 70% by weight of a butadiene rubber containing syndiotactic crystals, 60 to 75 parts by weight of a carbon black having a specified iodine adsorption number and a specified oil absorption, 1 to 2 parts by weight of sulfur and 2 to 4 parts by weight of a sulfenamide accelerator, respectively, per 100 parts by weight of the rubber component, wherein the total amount of sulfur and the sulfenamide accelerator is from 3 to 5 parts by weight.

8 Claims, No Drawings

RUBBER COMPOSITION FOR REINFORCING BEAD OF TIRES WHICH CONTAINS BUTADIENE RUBBER WITH SYNDIOTACTIC CRYSTALS, CARBON BLACK, SULFUR AND SULFENAMIDE ACCELERATOR

BACKGROUND OF THE INVENTION

The present invention relates to a rubber composition suitable for reinforcing bead portion of pneumatic tires, and more particularly to a rubber composition suitable for use in a chafer in the bead portion of heavy duty tires for an auto truck, auto bus and other large vehicles.

Tires used for trucks, buses and so on are required to have high speed performance because of the spread of a superhighway, and in addition so that they can bear a larger load with the increase of size and loadage of the vehicles. Consequently, rubber compositions used in the chafer disposed in bead of tires are required more and more to have high hardness, high durability and high aging resistance.

Since these tires are recapped and reused by re-covering their tread rubber after the completion of the first life, they are also required to be free from fault. One of faults which prevents the recapping of used tires is deformation of the bead in tube tires. Bead deformation is a phenomenon that occurs in tube tires with the rubber in the bead caves in at a spacing between the wheel rim and a ring, thus resulting in deformation after use for a long term. Rubber compositions used in the chafer and bead of tube tires are required to have high hardness, high durability and high aging resistance also in order to prevent occurrence of this phenomenon.

In order to obtain rubber compositions satisfying these properties, it has been practiced (1) to select the kind of carbon black or to increase the amount of carbon black, (2) to increase the amount of sulfur, or (3) to use ultraaccelerator TT (tetramethylthiuramdisulfide). However, the use of a large amount of carbon black causes problems in processing that it becomes difficult to conduct milling with good dispersion, and burning takes place due to heat generation resulting from high loading, and a problem that the crack growth resistance of the rubber is deteriorated. When a large amount of sulfur is incorporated in a rubber, there arise problems that change in physical properties owing to heat, change in physical properties with the lapse of time and a permanent set (deformation owing to heat) become large, and the aging resistance and a resistance to breaking such as cracking are deteriorated. Since the thiuram ultraaccelerator TT produces nitrosoamine which is a cancer causing substance and was found as a mutagen, its use is being prohibited. It is also proposed in Japanese Patent Publication Kokoku No. 57-20164 to incorporate a syndiotactic-1,2-polybutadiene short fiber into a rubber. However, the short fiber cannot be uniformly dispersed by application of a mechanical force and, therefore, desired physical properties are not obtained by incorporation of only such a short fiber.

It is an object of the present invention to provide a rubber composition suitable for reinforcing the bead of tires and having high hardness, high durability and high aging resistance.

A further object of the present invention is to provide a rubber composition suitable for use in the chafer in the bead of tube tires, which is excellent in processability such that it does not cause roll bagging and burning, and which is also excellent in hardness, durability and aging resistance and provides tires which avoid deformation in the bead, rim-chafing and cracking.

These and other objects of the present invention will become apparent from the description hereinafter.

SUMMARY OF THE INVENTION

It has been found that a rubber composition capable of providing a cured rubber having high hardness, high durability and high aging resistance with good processability is obtained when a butadiene rubber containing syndiotactic crystals is used with a curing system composed of sulfur and a sulfenamide accelerator, even if the amounts of sulfur and carbon black are suppressed.

In accordance with the present invention, there is provided a rubber composition suitable for reinforcing beads of tires which comprises (A) a rubber component containing 30 to 70% by weight of a butadiene rubber containing syndiotactic crystals and 70 to 30% by weight of other diene rubbers, the content of syndiotactic crystals in said butadiene rubber being 6 to 17% by weight, (B) 60 to 75 parts of a carbon black having an iodine adsorption number of 65 to 130 mg/g and an oil absorption of 90 to 140 ml/100 g, (C) 1 to 2 parts of sulfur, and (D) 2 to 4 parts of a sulfenamide accelerator, the total amount of said sulfur (C) and said accelerator (D) being from 3 to 5 parts, and said parts all being parts by weight per 100 parts by weight of said rubber component (A).

DETAILED DESCRIPTION

The rubber component used in the bead-reinforcing rubber composition of the present invention comprises a butadiene rubber containing syndiotactic crystals. The content of this butadiene rubber in the rubber component is from 30 to 70% by weight, preferably 40 to 60% by weight. When the butadiene rubber content is less than 30% by weight, the hardness and abrasion resistance of cured products obtained from the rubber composition tend to lower. When the butadiene rubber content is more than 70% by weight, the processability of the composition tends to deteriorate because the Mooney viscosity is high and accordingly extrusion and milling become difficult.

The butadiene rubber is typically a cis-1,4-polybutadiene. Preferably, the cis content of cis-1,4-polybutadiene is at least 90%.

The butadiene rubber containing syndiotactic crystals is used with at least one of other known diene rubbers, especially natural rubber, isoprene rubber, styrene-butadiene rubber and butadiene rubber free of syndiotactic crystals.

A representative example of the syndiotactic crystals is a syndiotactic-1,2-polybutadiene in the form of a short fiber.

The content of syndiotactic crystals in the butadiene rubber is from 6 to 17% by weight, preferably 10 to 15% by weight. When the syndiotactic crystal content is less than 6% by weight, the hardness and abrasion resistance tend to lower. When the content is more than 17% by weight, the processability tends to deteriorate.

Preferable examples of the butadiene rubber containing syndiotactic crystals are, for instance, a mixture of a cis-1,4-polybutadiene as a matrix and a syndiotactic-1,2-polybutadiene short fiber dispersed in the matrix, and a block copolymer or graft copolymer of cis-1,4-polybutadiene and syndiotactic-1,2-polybutadiene wherein the syndiotactic-1,2-polybutadiene in the form of a short fiber is block-copolymerized or graft-copolymerized to cis-1,4-polybutadiene.

Such a cis-1,4-polybutadiene containing a crystalline syndiotactic-1,2-polybutadiene in the form of a short fiber is known in the art and is obtained for instance by a method wherein a crystalline syndiotactic-1,2-polybutadiene is mechanically mixed with a matrix cis-1,4-polybutadiene so as to disperse a crystal short fiber into the matrix; or by a two stage polymerization method wherein cis-polymerization of butadiene is first conducted and subsequently 1,2-syndiotactic polymerization of butadiene is conducted in the presence of the produced cis-1,4-polybutadiene so as to produce a block or graft copolymer of cis-1,4-polybutadiene and syndiotactic-1,2-polybutadiene or a mixture of cis-1,4-polybutadiene as a matrix and a crystalline syndiotactic-1,2-polybutadiene short fiber dispersed into the matrix.

In case of the mechanical mixing method, cis-1,4-polybutadiene containing a crystalline syndiotactic-1,2-polybutadiene short fiber having the maximum diameter of not more than 10 μm and an average diameter of less than 1 μm can be advantageously prepared, for instance, by kneading particles of syndiotactic-1,2-polybutadiene having a particle size of 10 to 700 μm with uncured cis-1,4-polybutadiene at a temperature of not more than 190° C., extruding the obtained mixture at a temperature higher than the melting point of syndiotactic-1,2-polybutadiene by at least 5° C. through a circular dia having an inner diameter of 1 to 5 mm and a length/inner diameter ratio of 1 to 20, cooling the extrudate to room temperature and drawing it by rolls at a roll temperature of 50° to 100° C.

The mixture of cis-1,4-polybutadiene and a short fiber of crystalline syndiotactic-1,2-polybutadiene prepared by the two stage polymerization method is particularly preferred in the present invention. This mixture is in the form of a composite composed of an elastomer and fibrous crystals. Since in the second stage of polymerization butadiene is polymerized with stirring in the presence of a syndiotactic polybutadiene polymerization initiator in a highly viscous solution of a high cis-1,4-polybutadiene produced in the first stage, syndiotactic-1,2-polybutadiene is produced in a fine fibrous form by a high shearing force and uniformly dispersed in the cis-1,4-polybutadiene matrix. The syndiotactic-1,2-polybutadiene short fiber usually has a diameter of 0.02 to 0.1 μm and a degree of crystallization of at least 70%, especially at least 80%. Such a composite polybutadiene is commercially available under the trade mark "UBEPOL-VCR" from Ube Industries, Ltd., and UBEPOL-VCR 406, 412 and 617 can be used in the present invention.

The carbon black used in the present invention is those having an iodine adsorption number of 65 to 130 mg/g, preferably 75 to 125 mg/g, and an oil absorption of 90 to 140 ml/100 g as measured using dibutyl phthalate (DBP). When the iodine adsorption number is less than 65 mg/g, the hardness and abrasion resistance tend to lower, and when the iodine adsorption number is more than 130 mg/g, the permanent set under a constant stress and the rate of hardness rise after heat aging tend to deteriorate. When the oil absorption is less than 90 ml/100 g, the hardness and abrasion resistance tend to lower, and when the oil absorption is more than 140 ml/100 g, the processability tends to deteriorate, since the viscosity of rubber rises.

Examples of such a carbon black are, for instance, N220, N330 and N550 provided in ASTM.

The carbon black is used in an amount of 60 to 75 parts by weight per 100 parts by weight of the rubber component. When the amount of carbon black is less than 60 parts by weight, the hardness, abrasion resistance and permanent set under a constant stress tend to deteriorate. When the amount of carbon black is more than 75 parts by weight, the processability tends to deteriorate.

Sulfur is used in an amount of 1 to 2 parts by weight per 100 parts by weight of the rubber component. When the amount of sulfur is less than 1 part by weight, the desired hardness is not obtained, and when the amount of sulfur is more than 2 parts by weight, the permanent set under a constant stress and the rate of hardness rise by thermal aging tend to deteriorate.

It is important to use a specified amount of sulfur with a specified amount of a sulfenamide accelerator.

Known sulfenamide accelerators can be used in the present invention. Examples of the sulfenamide accelerator are, for instance, N-tert-butyl-2-benzothiazolylsulfenamide (TBBS), N-cyclohexyl-2-benzothiazolylsulfenamide (CBS), N-oxydiethylene-2-benzothiazolylsulfenamide (OBS) and N,N-dicyclohexyl-2-benzothiazolylsulfenamide (DZ).

The sulfenamide accelerator is used in an amount of 2 to 4 parts by weight per 100 parts by weight of the rubber component. When the amount of the accelerator is less than 2 parts by weight, the desired hardness is not obtained. When the amount of the accelerator is more than 4 parts by weight, the rubber composition has a tendency that the scorching time is short and burning takes place during processing.

It is preferable that the total amount of sulfur and the sulfenamide accelerator is from 3 to 5 parts by weight per 100 parts by weight of the rubber component, and the ratio of sulfenamide accelerator to sulfur is from 1 to 4 by weight. When the total amount is less than 3 parts by weight, the hardness and the durability are lowered. When the total amount is more than 5 parts by weight, the processability (burning) and permanent set tend to deteriorate. Also, when the accelerator/sulfur ratio is less than 1, the rate of hardness rise by thermal aging tends to increase, and when the accelerator/sulfur ratio is more than 4, the composition has a tendency that the scorching time becomes short and burning takes place during processing.

The rubber composition of the present invention may contain other additives for rubbers generally used in the production of tires, for example, antioxidant, softener, activator such as zinc oxide or stearic acid, a curing retarder and the like.

From the viewpoint of application to reinforcement of beads of tires, it is preferable that the rubber composition of the present invention is such that the cured product obtained from the composition has a JIS A hardness measured at 20° C. of at least 75, especially at least 80, and preferably up to 90, a rate of rise in hardness by thermal aging of at most 10%, especially at most 8%, a permanent set under a constant stress of at most 12%, especially at most 10%, and a picoabrasion index of at least 240, especially at least 250, as measured according to ASTM D 2288. When the JIS A hardness is less than 75, the hardness is insufficient for reducing deformation of bead. When the rate of rise in hardness by thermal aging is more than 10%, beads of used tires have a greatly increased hardness and accordingly recapped tires would cause damage such as cracking. When the picoabrasion index is less than 240, rim chafing characteristic tends to deteriorate.

The term "JIS A hardness" as used herein means a hardness measured at 20° C. using an A type hardness tester according to JIS K 6301.

The term "rate of rise in hardness by thermal aging" as used herein indicates a value calculated according to the equation:

$$\text{Rate of hardness rise (\%)} = \frac{q-p}{p} \times 100$$

wherein p is a value of JIS A hardness of a cured product measured at 20° C., and q is a value of JIS A hardness of the cured product measured at 20° C. after allowing the cured poduct to stand in an oven at 100° C. for 144 hours.

The term "permanent set under a constant stress" as used herein indicates a value obtained by putting bench marks of 2 cm interval on a JIS No. 3 dumbbell specimen punched out of a slab of a cured rubber composition having a thickness of 2 mm, elongating the specimen by a constant stress of 20 kgf/cm², allowing to stand in an oven at 100° C. for 2 hours in that state, releasing the stress, allowing the specimen to stand at room temperature for 30 minutes, measuring the distance r between the marks and calculating the permanent set (%) according to the following equation:

$$\text{Permanent set (\%)} = \frac{r-2}{2} \times 100$$

The present invention is more specifically described and explained by means of the following Examples wherein all parts and % are by weight unless otherwise noted. It is to be understood that the present invention is not limited to the Examples.

EXAMPLE 1

Rubber compositions were prepared according to the following recipe using a rubber shown in Table 1 by kneading a rubber, a filler and reagents in a BR type Banbury mixer with adding them in that order, and then mixing the mixture with a curing agent (sulfur) and a curing accelertor on 8 inch rolls.

| Ingredients | Amount (part) |
| --- | --- |
| Rubber | 100 |
| Carbon black N220*¹ | 70 |
| Wax | 1 |
| Antioxidant RD*² | 2 |
| Stearic acid | 2 |
| Zinc oxide | 3 |
| Sulfur | 1.5 |

-continued

| Ingredients | Amount (part) |
| --- | --- |
| Curing accelerator TBBS*³ | 2 |
| Curing retarder PVI*⁴ | 0.3 |

(Notes)
*¹Carbon black N220 (iodine adsorption number 121 mg/g, oil absorption 114 ml/100 g) made by Showa Cabot Kabushiki Kaisha
*²Poly(2,2,4-trimethyl-1,2-dihydroquinone) made by Ouchi Shinko Kagaku Kabushiki Kaisha
*³N-tert-butyl-2-benzothiazolylsulfenamide made by Ouchi Shinko Kagaku Kabushiki Kaisha
*⁴N-cyclohexylthiophthalimide made by Japan Monsanto Kabushiki Kaisha The Mooney viscosity ($ML_{1+4}$) and scorching time ($t_{10}$) of the rubber composition were measured at 130° C. according to JIS K 6300.

The rubber compositions were cured at 150° C. for 30 minutes, and the properties of the cured products were measured.

The results are shown in Table 1.

TABLE 1

| | Run No. | | | | | |
| --- | --- | --- | --- | --- | --- | --- |
| | 1-1 | 1-2 | 1-3 | 1-4 | 1-5 | 1-6 |
| Natural rubber | 40 | 40 | 40 | 40 | 40 | 40 |
| BR 150B*¹ | 60 | — | — | — | — | — |
| VCR*² 303 | — | 60 | — | — | — | — |
| VCR 406 | — | — | 60 | — | — | — |
| VCR 412 | — | — | — | 60 | — | — |
| VCR 617 | — | — | — | — | 60 | — |
| Composite rubber*³ | — | — | — | — | — | 60 |
| Mooney test | | | | | | |
| $ML_{1+4}$ | 70 | 75 | 80 | 88 | 98 | 110 |
| $t_{10}$ | 21 | 21 | 21 | 20 | 17 | 15 |
| JIS A hardness | | | | | | |
| Before aging | 74 | 77 | 78 | 81 | 85 | 87 |
| After aging (100° C., 144 hrs) | 80 | 83 | 84 | 88 | 91 | 91 |
| Rate of hardness rise (%) | 8 | 8 | 8 | 8 | 7 | 5 |
| Permanent set (%) | 14.0 | 12.3 | 10.7 | 9.9 | 8.2 | 7.6 |
| Picoabrasion index | 228 | 238 | 243 | 257 | 268 | 273 |

(Notes)
*¹Cis-1,4-polybutadiene made by Ube Industries, Ltd.
*²A composite rubber composed of a matrix cis-1,4-polybutadiene (BR) and a fibrous, high crystalline syndiotactic-1,2-polybutadiene (hereinafter referred to as "sPB") dispersed in the matrix, which is commercially available under the trade mark "UBEPOL-VCR" from UBE Industries, Ltd. and wherein VCR 303 contains 3% of sPB, VCR 406 contains 6% of sPB, VCR 412 contains 12% of sPB and VCR 617 contains 17% of sPB
*³A composite rubber composed of the matrix BR and 20% of sPB dispersed in the matrix BR The composition of Run Nos. 1-3 to 1-5 have well-balanced good properties such as processability, hardness, durability and aging resistance and are superior to the compositions of Run Nos. 1-1, 1-2 and 1-6. The composition of Run No. 1-1 is low in hardness and inferior in permanent set under constant stress and abrasion resistance, since a butadiene rubber containing syndiotactic crystals is not used. The composition of Run No. 1-2 wherein a composite rubber containing 3% of sPB is used, is inferior in permanent set under constant stress and abrasion resistance. The composition of Run No. 1-6 is poor in processability because of high Mooney viscosity.

EXAMPLE 2

Rubber compositions were prepared in the same manner as in Example 1 according to the following recipe using carbon black shown in Table 2. The rubber compositions were cured at 150° C. for 30 minutes.

The properties of the compositions and the cured products are shown in Table 2.

| Ingredients | Amount (part) |
| --- | --- |
| Natural rubber | 40 |
| UBEPOL-VCR 412 | 60 |
| Carbon black | 70 |
| Wax | 1 |
| Antioxidant RD | 2 |
| Stearic acid | 2 |
| Zinc oxide | 3 |
| Sulfur | 1.5 |
| Curing accelerator TBBS | 2 |
| Curing retarder PVI | 0.3 |

TABLE 2

| | Run No. | | | | |
| --- | --- | --- | --- | --- | --- |
| | 2-1 | 2-2 | 2-3 | 2-4 | 2-5 |
| Rubber component | | | | | |
| Natural rubber | 40 | 40 | 40 | 40 | 40 |
| VCR 412 | 60 | 60 | 60 | 60 | 60 |
| Carbon black* | | | | | |
| N550 | 70 | — | — | — | — |
| N330 | — | 70 | — | — | — |
| N220 | — | — | 70 | — | — |
| N326 | — | — | — | 70 | — |
| N110 | — | — | — | — | 70 |
| Mooney test | | | | | |
| $ML_{1+4}$ | 68 | 76 | 88 | 73 | 102 |
| $t_{10}$ | 26 | 23 | 20 | 25 | 15 |
| JIS A hardness | | | | | |
| Before aging | 74 | 78 | 81 | 76 | 85 |
| After aging (100° C., 144 hrs) | 80 | 84 | 88 | 81 | 93 |
| Rate of hardness rise (%) | 8 | 8 | 8 | 7 | 9 |
| Permanent set (%) | 12.5 | 8.8 | 9.9 | 12.2 | 12.4 |
| Picoabrasion index | 234 | 250 | 257 | 239 | 269 |

(Notes)
*Carbon black made by Showa Cabot Kabushiki Kaisha, the iodine adsorption number and oil absorption of which are as follows:
N550: iodine adsorption number 43 mg/g, oil absorption 121 ml/100 g
N330: iodine adsorption number 82 mg/g, oil absorption 102 ml/100 g
N220: iodine adsorption number 121 mg/g, oil absorption 114 ml/100 g
N326: iodine adsorption number 82 mg/g, oil absorption 72 ml/100 g
N110: iodine adsorption number 145 mg/g, oil absorption 113 mg/100 g The compositions of Run Nos. 2-2 and 2-3 have well-balanced good properties and are superior to the compositions of Run Nos. 2-1, 2-4 and 2-5. The composition of Run No. 2-1 is low in hardness and inferior in permanent set and abrasion resistance, since the iodine adsorption number of carbon black used is small. The composition of Run No. 2-4 is inferior in permanent set and abrasion resistance, since the oil absorption of carbon black used is small. The composition of Run No. 2-5 is inferior in permanent set, since the iodine adsorption number of carbon black used is large.

EXAMPLE 3

The procedure of Example 1 was repeated except that a rubber composition was prepared according to the following recipe.

| Ingredients | Amount (part) |
| --- | --- |
| Natural rubber | 40 |
| UBEPOL-VCR 412 | 60 |
| Carbon black N330* | 55 |
| Wax | 1 |
| Antioxidant RD | 2 |
| Stearic acid | 2 |
| Zinc oxide | 3 |
| Sulfur | 1.5 |
| Curing accelerator TBBS | 2 |
| Curing retarder PVI | 0.3 |

(Notes)
*N330 iodine adsorption number 82 mg/g, oil absorption 102 ml/100 g

The above procedure was repeated except that the amount of carbon black N330 was varied as shown in Table 3.

The results are shown in Table 3.

TABLE 3

| | Run No. | | | | | |
| --- | --- | --- | --- | --- | --- | --- |
| | 3-1 | 3-2 | 3-3 | 3-4 | 3-5 | 3-6 |
| Rubber component | | | | | | |
| Natural rubber | 40 | 40 | 40 | 40 | 40 | 40 |
| VCR 412 | 60 | 60 | 60 | 60 | 60 | 60 |
| Carbon black N330 | 55 | 60 | 65 | 70 | 75 | 80 |
| Mooney test | | | | | | |
| $ML_{1+4}$ | 62 | 67 | 71 | 76 | 81 | 95 |
| $t_{10}$ | 30 | 26 | 25 | 23 | 18 | 14 |
| JIS A hardness | | | | | | |
| Before aging | 73 | 75 | 77 | 78 | 81 | 84 |
| After aging (100° C., 144 hrs) | 77 | 80 | 83 | 84 | 88 | 93 |
| Rate of hardness rise (%) | 6 | 7 | 8 | 8 | 9 | 11 |
| Permanent set (%) | 12.7 | 11.5 | 9.8 | 8.8 | 9.0 | 11.2 |
| Picoabrasion index | 231 | 240 | 248 | 250 | 253 | 255 |

The compositions of Run Nos. 3-2 to 3-5 have well-balanced good properties and are superior to the compositions of Run Nos. 3-1 and 3-6. The composition of Run No. 3-1 containing 55 parts of carbon black is low in hardness and inferior in permanent set and abrasion resistance. The composition of Run No. 3-6 containing 80 parts of carbon black is inferior in aging resistance (rate of hardness rise).

EXAMPLE 4

The procedure of Example 1 was repeated except that rubber compositions were prepared according to the following recipe using the rubber shown in Table 4.

The results are shown in Table 4.

| Ingredients | Amount (part) |
|---|---|
| Natural rubber | 100 |
| Carbon black N220* | 70 |
| Wax | 1 |
| Antioxidant RD | 2 |
| Stearic acid | 2 |
| Zinc oxide | 3 |
| Sulfur | 1.5 |
| Curing accelerator TBBS | 2 |
| Curing retarder PVI | 0.5 |

(Notes)
*N220: iodine adsorption number 121 mg/g, oil absorption 114 mg/100 g

TABLE 4

| | Run No. | | | | |
|---|---|---|---|---|---|
| | 4-1 | 4-2 | 4-3 | 4-4 | 4-5 |
| Rubber component | | | | | |
| Natural rubber | 80 | 60 | 40 | 20 | 50 |
| UBEPOL-VCR 412 | 20 | 40 | 60 | 80 | 50 |
| Mooney test | | | | | |
| $ML_{1+4}$ | 70 | 78 | 88 | 102 | 82 |
| $t_{10}$ | 15 | 18 | 20 | 23 | 19 |
| JIS A hardness | | | | | |
| Before aging | 74 | 78 | 81 | 84 | 80 |
| After aging (100° C., 144 hrs) | 80 | 84 | 88 | 92 | 86 |
| Rate of hardness rise (%) | 8 | 8 | 8 | 9 | 8 |
| Permanent set (%) | 14.5 | 12.0 | 9.9 | 7.6 | 10.8 |
| Picoabrasion index | 230 | 242 | 257 | 267 | 250 |

The compositions of Run Nos. 4-2, 4-3 and 4-5 have well-balanced good properties and are superior to the compositions of Run Nos. 4-1 and 4-4. The composition of Run No. 4-1 wherein a butadiene rubber containing syndiotactic crystals is used in an amount of 20 parts, is inferior in hardness, permanent set and picoabrasion index. The composition of Run No. 4-4 wherein a butadiene rubber containing syndiotactic crystals is used in an amount of 80 parts, is poor in processability because the Mooney viscosity is too high.

EXAMPLE 5

The procedure of Example 1 was repeated except that a rubber composition was prepared according to the following recipe.

| Ingredients | Amount (part) |
|---|---|
| Natural rubber | 40 |
| UBEPOL-VCR 412 | 60 |
| Carbon black N220 | 70 |
| Wax | 1 |
| Antioxidant RD | 2 |
| Stearic acid | 2 |
| Zinc oxide | 3 |
| Sulfur | 1 |
| Curing accelerator TBBS | 1 |
| Curing retarder PVI | 0.3 |

The above procedure was repeated except that the amounts of curing agent (sulfur) and curing accelerator were varied as shown in Table 5.

The results are shown in Table 5.

TABLE 5

| | Run No. | | | | | | | | | | | |
|---|---|---|---|---|---|---|---|---|---|---|---|---|
| | 5-1 | 5-2 | 5-3 | 5-4 | 5-5 | 5-6 | 5-7 | 5-8 | 5-9 | 5-10 | 5-11 | 5-12 |
| Natural rubber | 40 | 46 | 40 | 40 | 40 | 40 | 40 | 40 | 40 | 40 | 40 | 40 |
| UBEPOL-VCR 412 | 60 | 60 | 60 | 60 | 60 | 60 | 60 | 60 | 60 | 60 | 60 | 60 |
| Sulfur | 1 | 1 | 1 | 1 | 1 | 2 | 2 | 2 | 2 | 2 | 3 | 0.5 |
| Curing accelerator TBBS | 1 | 2 | 3 | 4 | 5 | 1 | 2 | 3 | 4 | 5 | 3 | 2 |
| Curing retarder PVI | 0.3 | 0.3 | 0.3 | 0.3 | 0.3 | 0.3 | 0.3 | 0.3 | 0.3 | 0.3 | 0.3 | 0.3 |
| Mooney test | | | | | | | | | | | | |
| $ML_{1+4}$ | 87 | 88 | 86 | 85 | 86 | 87 | 85 | 86 | 87 | 88 | 87 | 86 |
| $t_{10}$ | 24 | 21 | 18 | 15 | 10 | 22 | 18 | 15 | 13 | 11 | 12 | 23 |
| JIS A hardness | | | | | | | | | | | | |
| Before aging | 78 | 80 | 82 | 83 | 86 | 82 | 85 | 86 | 88 | 89 | 87 | 77 |

TABLE 5-continued

|  | Run No. | | | | | | | | | | | |
| --- | --- | --- | --- | --- | --- | --- | --- | --- | --- | --- | --- | --- |
|  | 5-1 | 5-2 | 5-3 | 5-4 | 5-5 | 5-6 | 5-7 | 5-8 | 5-9 | 5-10 | 5-11 | 5-12 |
| After aging (100° C., 114 hrs) | 86 | 86 | 87 | 87 | 89 | 91 | 92 | 92 | 92 | 93 | 97 | 82 |
| Rate of hardness rise (%) | 10 | 8 | 6 | 5 | 4 | 11 | 8 | 7 | 5 | 5 | 11 | 6 |
| Permanent set (%) | 12.3 | 10.2 | 9.5 | 8.9 | 8.0 | 12.1 | 10.0 | 9.3 | 8.5 | 7.6 | 9.0 | 11.2 |
| Picoabrasion index | 238 | 250 | 252 | 257 | 255 | 240 | 252 | 256 | 261 | 262 | 257 | 225 |

The compositions of Run Nos. 5-2 to 5-4, 5-7 and 5-8 have well-balanced good properties and are superior to the compositions of Run Nos. 5-1, 5-5, 5-6 and 5-9 to 5-12. The composition of Run No. 5-1 containing 1 part of sulfur and 1 part of the sulfenamide accelerator TBBS is inferior in permanent set and abrasion resistance. The compositions of Run Nos. 5-5 and 5-10 containing 5 parts of the sulfenamide accelerator TBBS are poor in processability because the scorching time is short and burning is easy to occur. The composition of Run No. 5-6 containing 2 parts of sulfur and 1 part of the sulfenamide accelerator TBBS is inferior in permanent set. The composition of Run No. 5-9 containing sulfur and sulfenamide accelerator in a total amount of 6 parts is inferior in processability because the scorching time is short and burning is easy to occur. The composition of Run No. 5-11 containing 3 parts of sulfur is inferior in rate of hardness rise. The composition of Run No. 5-12 containing 0.5 part of sulfur is inferior in picoabrasion index.

EXAMPLE 6

The processability of the compositions of Run Nos. 1-1, 1-4, 1-6, 2-5 and 5-4 obtained in Exmaples 1, 2 and 5 was estimated according to the following methods.

The results are shown in Table 6.

Roll bagging characteristic

Ingredients for a rubber composition were kneaded by a BR type Banbury mixer, and the mixture was formed into a sheet having a thickness of 2 mm. The sheet was milled by a mixing mill at a roll temperature of 60° C. and at a forward rotation of 20 r.p.m. and a backward rotation of 19 r.p.m., and the workability till the sheet was wound on 8 inch rolls was estimated.

The workability of the composition of Run No. 1-1 was estimated as "slightly bad", and the workability of other compositions were relatively estimated comparing with the workability of the composition of Run No. 1-1.

Burning

After kneading a rubber composition, it was milled by 8 inch rolls at a roll temperature of 120° C. for 5 minutes, and occurrence of burning was observed.

TABLE 6

|  | Run No. of the composition used | | | | |
| --- | --- | --- | --- | --- | --- |
|  | 1-1 | 1-4 | 1-6 | 2-5 | 5-4 |
| Roll bagging characteristic | slightly bad | good | good | good | good |
| Burning | none | none | slight burning | burning | none |

EXAMPLE 7

Tires (10.00R20, SP540) were prepared using a chaffer prepared from each of the rubber compositions of Run Nos. 1-1, 1-4, 2-1, 5-1, 5-8, 5-6 and 5-12. The tires were attached to an auto car, subjected to a 100,000 km practical running test and estimated with respect to degree of deformatin, rim chafing and chipping as follows:

The results are shown in Table 7.

Degree of deformation of bead base

A wheel rim was dettached, and the size (mm) of a protuberance produced by deformation of a bead base located below a bead core, namely the height of the protuberance between the top of the protuberance and the bottom of the bead base was measured and estimated according to the following rating.

A: The size of deformation is less than 1 mm.

B: The size of deformation is from 1 to 5 mm

C: The size of deformation is more than 5 mm.

The size of the deformation for the composition of Run No. 1-1 was 3 mm.

Rim chafing

A wheel rim was dettached, and the degree of chafing of a rubber at the surface contacting a rim flange was visually estimated.

The result for the composition of Run No. 7-1 was regarded as B, and the estimation was made in three rating A, B and C wherein:

A indicates the state that a scratch or the like owing to chafing of a bead rubber with a rim flange is slightly observed at the contacting surface, B indicates the state that a bead rubber sinks or is scratched at a part of the contacting surface owing to chafing with a rim flange, and C indicates the state that a bead rubber sinks at the contacting surface owing to chafing with a rim flange.

Cracking

After dettaching a wheel rim, the entire of the bead was visually observed with respect to the degree of cracking.

TABLE 7

|  | Run No. of the composition used | | | | | | |
| --- | --- | --- | --- | --- | --- | --- | --- |
|  | 1-1 | 1-4 | 2-1 | 5-1 | 5-8 | 5-6 | 7-7 |
| Degree of deformation | B | A | B | B | A | C | A |
| Rim chafing | B | A | B | B | A | B | C |
| Cracking | none | none | none | none | none | slightly cracking | none |

The rubber compositions of Run Nos. 1-4 and 5-8 according to the present invention only showed a slight deformation and a slight rim chafing, and also did not cause cracking.

In addition to the ingredients used in the Examples, other ingredients can be used in the Examples as set forth in the specification to obtain substantially the same results.

What we claim is:

1. A rubber composition suitable for reinforcing beads of tires which comprises (A) a rubber component containing 30 to 70% by weight of a butadiene rubber containing syndiotactic crystals and 70 to 30% by weight of other diene rubbers, the content of syndiotactic crystals in said butadiene rubber being 6 to 17% by weight (B) 60 to 75 parts of a carbon black having an iodine adsorption number of 65 to 130 mg/g and an oil absorption of 90 to 140 ml/100 g, (C) 1 to 2 parts of sulfur, and (D) 2 to 4 parts of a sulfenamide accelerator, the total amount of said sulfur (C) and said accelerator (D) being from 3 to 5 parts, and said parts all being parts by weight per 100 parts by weight of said rubber component (A), wherein the ratio of said sulfenamide accelerator to said sulfur is from 1 to 4 by weight, and wherein the rubber composition has a JIS A hardness of at least 75, a rate of rise in hardness by thermal aging of at most 10%, a permanent set under a constant stress 20 kgf/cm$^2$ of at most 12% and a picoabrasion index of at least 240 measured according to ASTM D 2288.

2. The composition of claim 1, wherein said butadiene rubber containing syndiotactic crystals is a mixture of a matrix cis-1,4-polybutadiene and a fibrous crystalline syndiotactic-1,2-polybutadiene dispersed in the matrix.

3. The composition of claim 2, wherein said mixture is a product prepared by a two stage polymerization of butadiene in which butadiene is polymerized first by a cis-polymerization and subsequently polymerized in the same system by a 1,2-syndiotactic-polymerization.

4. The composition of claim 1, wherein said butadiene rubber containing syndiotactic crystals is a block or graft copolymer of a cis-1,4-polybutadiene and a crystalline syndiotactic-1,2-polybutadiene.

5. The composition of claim 1, wherein the content of said butadiene rubber containing syndiotactic crystals in said rubber component is from 40 to 60% by weight.

6. The composition of claim 1, wherein said carbon black has an iodine adsorption number of 75 to 125 mg/g.

7. The composition of claim 1, wherein said sulfenamide accelerator is at least one member selected from the group consisting of N-tert-butyl-2-benzothiazolylsulfenamide, N-cyclohexyl-2-benzothiazolylsulfenamide, N-oxydiethylene-2-benzothiazolylsulfenamide and N,N-dicyclohexyl-2-benzothiazolylsulfenamide.

8. The composition of claim 1, wherein said other diene rubber is at least one member selected from the group consisting of natural rubber, isoprene rubber and a butadiene rubber containing no syndiotactic crystals.

* * * * *